RODNEY A. HENRIE
HARVEY R. STONER
INVENTORS

BY *A. H. Caser*

ATTORNEY

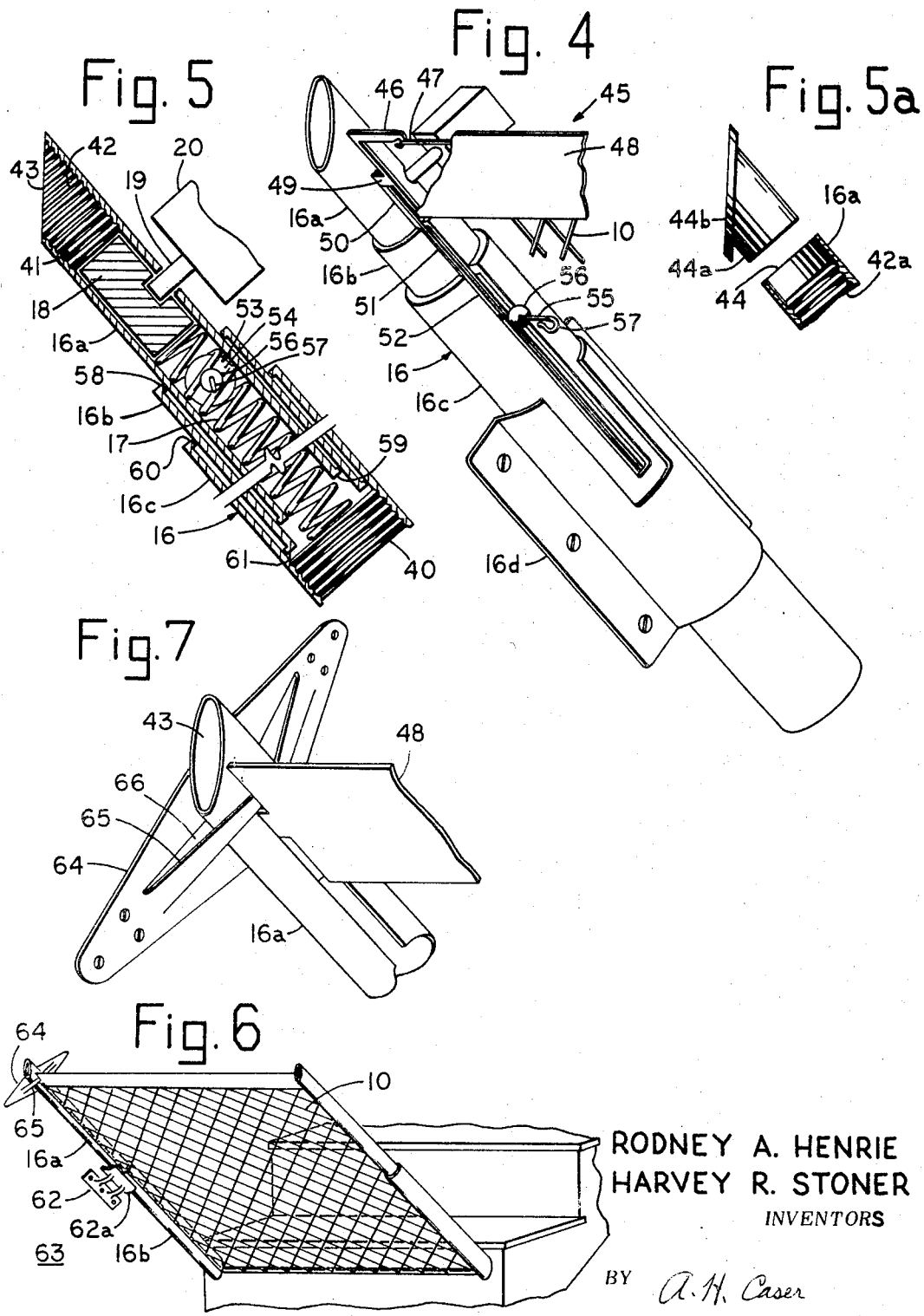

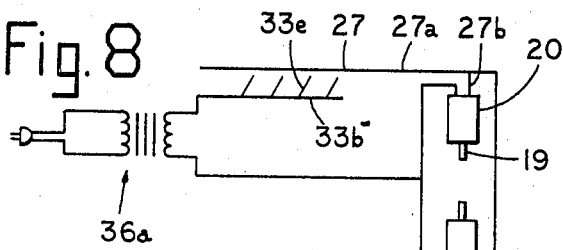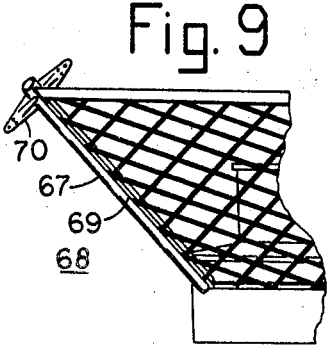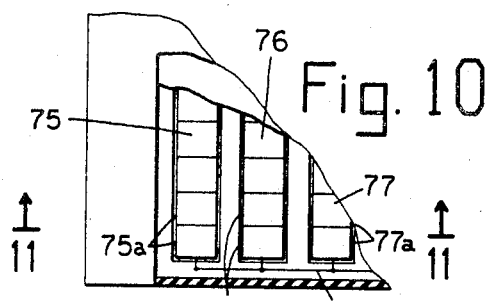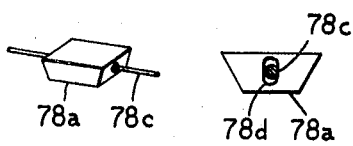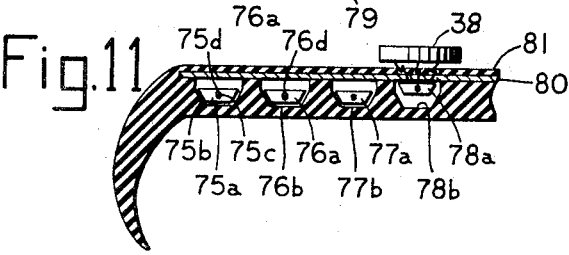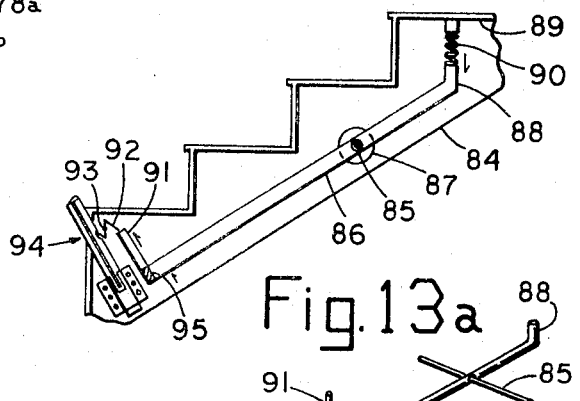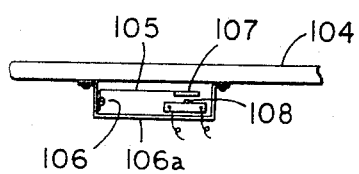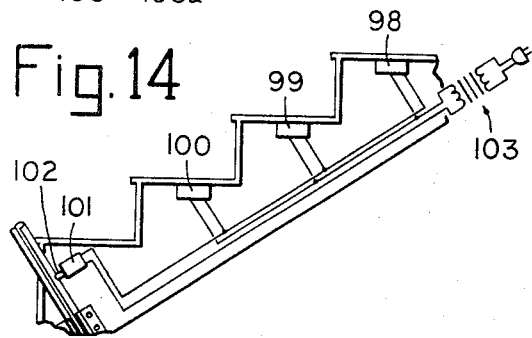

April 22, 1969   R. A. HENRIE ET AL   3,439,775
SAFETY DEVICE FOR STAIRS
Filed Nov. 15, 1967   Sheet 4 of 4
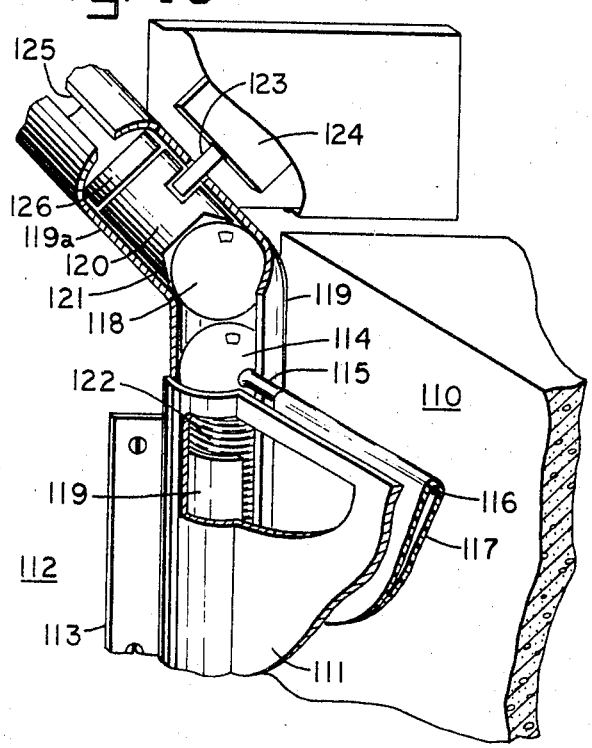
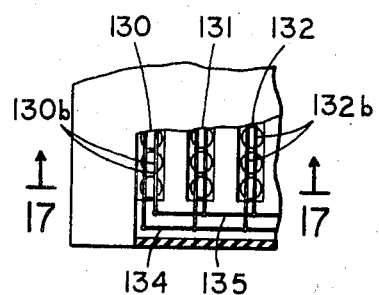
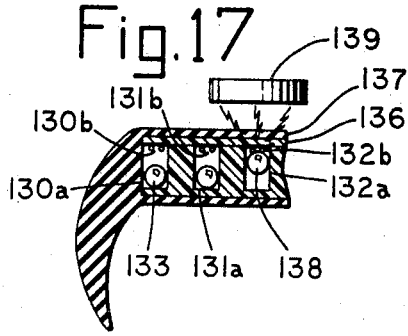
RODNEY A. HENRIE
HARVEY R. STONER
INVENTORS
BY A. H. Casar
ATTORNEY 3,439,775
SAFETY DEVICE FOR STAIRS
Rodney A. Henrie, 136 E. 3rd St., and Harvey R. Stoner,
14 S. Vine St., both of Mount Carmel, Pa. 17851
Filed Nov. 15, 1967, Ser. No. 683,263
Int. Cl. E04f 11/00; A62b 1/22; E04g 1/00
U.S. Cl. 182—138
9 Claims

ABSTRACT OF THE DISCLOSURE

An automatically-operated safety device is provided for protecting against injury persons, such as children and the aged, who are prone to fall down stairs. Operation of the device is initiated by the falling person.

Background of the Invention

The field of the invention comprises safety devices for stairs. So far as is known, the device described herein is new.

Summary of the invention

The device employs a yieldable barrier to catch a falling person and prevent him from falling a full flight of stairs, thus avoiding in particular injuries resulting from the severe sudden stop on the solid surface at the bottom of the stairs. When not in use, the barrier is retractable to an out of the way position where it is held by suitable stop means; it is releasable from such position and extendable to operative position by steps initiated by the falling person.

Brief description of the drawings

The invention is illustrated by the accompanying drawings, in which:

FIG. 4 is an enlarged view, partly broken, of the barrier-supporting structure shown in FIG. 1;

FIG. 5 is a longitudinal sectional view of a portion of the structure of FIG. 4;

FIG. 5a is a view of the upper end portion of FIG. 5, but showing a modification, together with a cap;

FIG. 6 is a view like FIG. 1 but showing the barrier in extended position and omitting part of the structure;

FIG. 7 is an enlarged view of a detail of FIG. 6, with part of the showing omitted for sake of clarity;

FIG. 8 is a diagram of an electric circuit for use with the arrangement shown in FIG. 1;

FIG. 9 is partial view, like FIG. 6, but showing a modification;

FIG. 10 is a partial view of a modified tread construction;

FIG. 11 is a cross-sectional view of the tread of FIG. 10, taken along the line 11—11;

FIG. 12 shows enlarged perspective and end views of a contact used in FIGS. 10 and 11;

FIG. 13 is a longitudinal sectional view, on a reduced scale, of stairs showing a modified structure for releasing the barrier;

FIG. 13a is a view, on a reduced scale, of a lever used with the modification of FIG. 13;

FIG. 14 is a view like FIG. 13 showing another modification;

FIG. 14a is an enlarged detailed view of a micro switch used in FIG. 14;

FIG. 15 is a partial view, partly in section, of another modification;

FIG. 16 is a view like FIG. 10 but showing a modification; and FIG. 17 is a view along line 17—17 of FIG. 16.

Description of the specific embodiments

Figure 1:
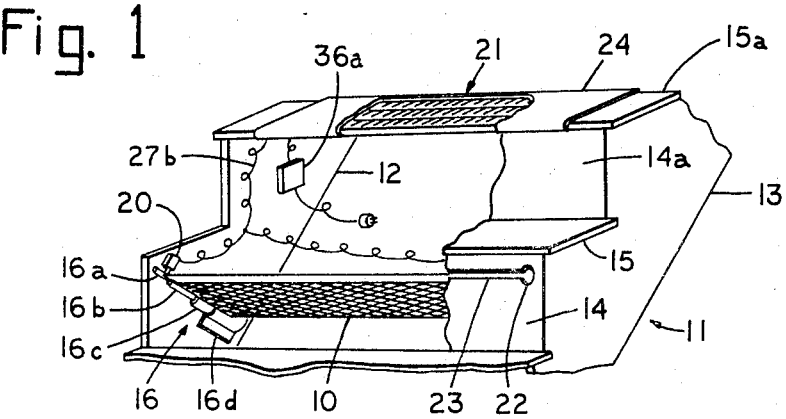
FIG. 1 is a broken-off view, on a reduced scale, of stairs with part of the structure omitted, showing the barrier in retracted position together with supporting structure therefor, and also showing means, partly in section, on a higher stair tread for controlling release of the barrier to an extended or operative position.

Referring to FIG. 1, the safety device comprises a yieldable barrier 10 disposed across the width of the stairs 11, the barrier being shown in retracted position beneath the stairs, it being understood that the latter have a hollow interior; that is, the stairs are of conventional type comprising a pair of stringers of stringboards 12, 13 provided with risers 14, 14a and treads 15, 15a. The barrier 10, which suitably may be a net, is supported at each lateral side by an elongated member, one of which is generally indicated at 16, and this member is elongatable as the barrier is extended. Member 16 comprises a plurality of telescoping tubes; preferably two of such tubes, 16a and 16b, are relatively movable and are disposed in a third tube 16c which is fixed to the stringer as by means of the fastening device 16d.

As best shown in FIG. 5, there are provided spring means in the form of compression spring 17 which is biased against the tube 16a in a manner to be described and which normally urges such tube, together with the barrier, towards the extended position thereof. Such action of the spring is opposed by stop means in the form of plug 18 which is held in stop position by the extended plunger 19 of a solenoid 20. When a person is falling on the stairs, he actuates means, generally designated 21, note FIG. 1, for releasing the stop means, this releasing action comprising the retraction of the extended plunger 19, which in turn allows the spring to push on plug 18. The net 10 is attached to the plug, and also, as will be described, to the elongated member 16, and is thus extended to a position where it may catch or intercept the falling person.

Figure 2:
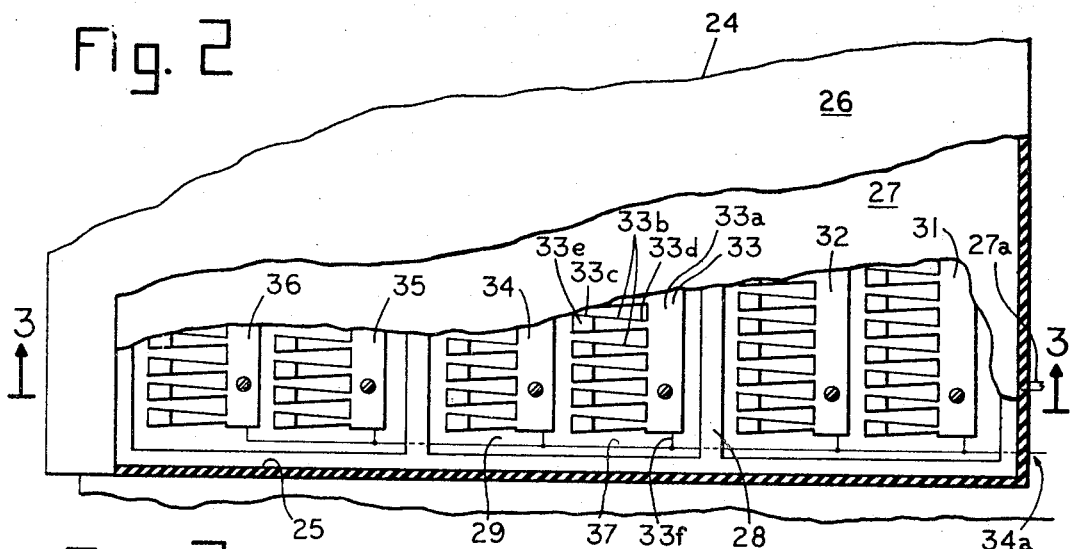
FIG. 2 is an enlarged view, partly in section, of the higher tread referred to in the preceding paragraph.
Figure 3:
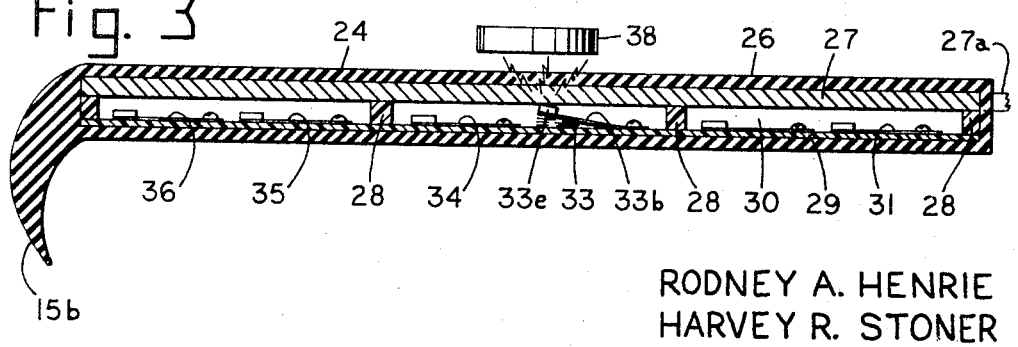
FIG. 3 is a transverse sectional view of the said higher tread, taken along the line 3—3 of FIG. 2.

Returning to FIG. 1, the member 16 and the net 10 are normally disposed beneath the stairs, where they are concealed from view. During extension, they pass through the opening 22 and the slot 23, respectively, in the riser 14. The described means 21, which a falling person actuates, comprises a mat 24 disposed on a tread 15a which is above the barrier. Tread 15a may be located one or more steps above the barrier. As shown in FIGS. 2 and 3, the mat 24 comprises an upper layer 26 of rubber or other suitable long-wearing nonconducting material, and beneath it a layer or plate 27 of conducting nonmagnetizable material such as aluminum, copper, and the like. Plate 27 has a conducting extension 27a which passes out of the mat and connects to lead 27b (FIG. 1) and thence to solenoid 20. Beneath layer 27, and spaced therefrom by strips 28, is a layer 29 of nonconducting material like plastic, there being formed a space 30 between the layers 27 and 29. Fastened to layer 29, as by screws, are a plurality of conducting strips 31, 32, 33, 34, 35, and 36, suitably of a flexible material such as copper foil, copper sheet, etc. Each strip, note strip 33 of FIG. 2, comprises a longitudinal anchor portion 33a, by means of which the strip is attached to layer 29, and from which there extend a plurality of movable reeds or reedlike members 33b. Each member 33b has a wide end 33c and a reduced neck 33d through which it is joined to portion 33a. A magnetizable contact 33e of steel, iron, or other ferrous metal is attached to the wide end 33c. A lead wire, note 33f of FIG. 2, connects the portion 33a to a conductor 37, which in turn passes out of the mat at 34a and eventually connects to the solenoid 20.

The operation of mat 24 is straightforward. The falling person carries on him, or on his clothing, and in one or more locations, as described below, a suitable magnet, shown for convenience at 38, note FIG. 3. When brought in close proximity to the mat, an action effected by the person as he falls, with or without conscious effort on his part, the magnet attracts one or more of the contacts 33e of the flexible reeds 33b and draws such contact upwardly into contact with the conducting plate 27, thereby establishing an electric circuit comprising, note FIG. 8, contact 33e, plate 27, leads 27a and 27b, solenoid 20, low voltage coil of step-down transformer 36a, reed 33b, and back to contact 33e. The transformer reduces line voltage to any suitable value, say about 24 volts, and the current to about 3 amperes. Energization of the described circuit energizes the solenoid 20, causing it to retract plunger 19, thus allowing spring 17 to move the elongated member and net to an extended position to catch the falling person.

Two solenoids are shown in FIG. 8, it being understood that one is disposed on each side of the stairs, as in the case of elongated member 16.

Considering FIGS. 4 and 5 in more detail, it will be noted that spring 17, which is to be considered as in a state of compression, bears against a threaded plug 40 at its lower end and against the plug 18 at its upper end. The plug 18 bears against a threaded plug 41, which may be installed in threaded bore 42 as by means of a screw driver-receiving slot, not shown. Bore 42 may terminate in the slanted opening 43, as shown, or in the straight opening as seen at 44 in FIG. 5a. In the latter figure the tube 16a may be only partly threaded, as at 42a, to receive a plug like 41. A cap 44a is provided for the opening 44, and this cap is flanged at 44b in order to cover the opening 22, note FIG. 1, of riser 14.

The net is provided with a reinforcement 45, note FIG. 4, on its leading edge comprising a right-angled corner piece 46 which is joined to the opposite corner piece, not shown, by a wire or other strand or rod 47, and overlapping the wire is a reversely folded strip 48 of leather, strong plastic, or the like. Corner piece 46 has an extension 49 which enters a slot 50 in tube 16a to fixedly engage a recess, not shown, in the plug 18. The slot 50 is in registration with a slot 51 in tube 16b and the latter slot registers with slot 52 in tube 16c, thus providing a passageway for extension 49 during retraction and extension of the barrier.

Each lateral side of the net 10 is engaged by a plurality of sliders, one of which is shown at 53 and which may be seen to comprise an anchor portion 54, a stem 55, a supporting ball portion 56, and a hook 57. Portion 54 is disposed within adjacent coils of spring 17 and serves to anchor the slider while permitting it to move with the extension and compression of the spring. Ball portion 56 supports the slider relatively to the tubes 16a, 16b, and 16c; it has a diameter larger than the width of slots 50–52, and is thus able to ride along the surface of the tubes. Hook 57 is engaged by the net.

In order to limit the extension of the tubes 16a–16c one within the other, interengaging stops are provided. Thus, for members 16a and 16b, the stops are 58 and 59, the former being an inwardly extending annular flange at the outer end of 16b, and the latter an outwardly extending annular flange at the inner end of 16a. Similarly interengaging flanges 60 and 61 are provided for tubes 16b and 16c.

FIG. 6 shows the barrier in extended position, with tubes 16a and 16b fully elongated, and with net 10 disposed across the width of the stairs. Tube 16c is disposed beneath the stairs. A wall support is shown at 62 having a pad 62a on which tubes 16a and 16b, at the wall side 63 of the barrier, may rest, the barrier being thus supported to catch and hold a falling person. At 64 another support device is mounted having an outwardly looped strip 65, note FIG. 7, which forms a slot 66 with the support for receiving the outer end 43 of tube 16a, providing additional support for the barrier. It will be understood that on extension of the barrier, tubes 16a and 16b at the wall side of the stairs or barrier are moved automatically into the supported positions shown in FIGS. 6 and 7.

FIG. 6 shows that the barrier may emerge from its retracted position at an angle of about 90 degrees to the incline of the stairs, where it offers a maximum surface to a falling person. The barrier may suitably be positioned half way, or two thirds of the way, down the stairs, although other positions are possible. It may also be disposed towards the bottom of the stairs, say at the first, second, third, etc., step, in which case it is preferred to use, on the wall side of the barrier, a single elongated member 67, note FIG. 9, which is fixedly secured to the wall 68. Member 67 is preferably in the form of a tube of steel or other strong material and is provided with a slot 69 in which the extension 49 of corner piece 46, note FIG. 4, may travel during extension and retraction of the barrier. A wall support 70 may fixedly hold the upper end of member 67. In other respects, the construction and operation of the modification of FIG. 9 is like that described. If desired, member 67 may be used on any step, rather than on the lower steps described.

It should be understood that two or more barriers may be provided, spaced along the stairs as desired, especially in the case of stairs of unusual length. In each case a mat like 24 is disposed one or more steps above its respective barrier.

When the extended barrier has served its purpose, it may be retracted by hand. The solenoid may be energized, as by bringing a magnet into operative position with respect to the mat, and in this way solenoid plunger 19 is kept withdrawn so as not to interfere with retraction of the barrier. With the latter in place, energization of the solenoid is halted to let the plunger engage the plug 18.

In FIGS. 10 and 11 a modified mat is shown in which the conducting strips 31–36 of FIGS. 2–3 are replaced by spaced rows 75, 76, 77, etc., of aligned conducting magnetizable blocks or contacts 75a, 76a, 77a, etc. Each row of blocks is aligned in a trough or groove 75b, 76b, 77b, etc., and the alignment of each row is further aided by the passage of a conducting wire or rod 75c, 76c, 77c, etc., through all the blocks of each row, the wire passing through openings 75d, 76d, 77d, etc. Preferably the opening is somewhat elongated, as seen at 78d in FIG. 12, and the wire 78c makes constant contact at each side thereof with the walls of the opening. The wires of each row emerge, as seen in FIG. 10, and join a conductor 79, similar to conductor 37 of FIG. 2. Covering the troughs is a nonmagnetizable conducting plate 80, and over this is a layer 81 as of rubber. At 38 is a magnet, as in FIG. 3. In operation, a block such as that a 78a is drawn upwardly, as shown in FIG. 11, by the attraction of the magnet, thereby making contact with conducting plate 80 and establishing a circuit like that of FIG. 8, with the result that the barrier is extended in the manner described. Upward movement of the block is favored by the flexiblity of the wire 78c and by the elongation of the opening 78d.

In FIG. 13 a mechanically actuated modification of the safety device is shown, in contrast to the magnetically and electrically actuated device of the preceding views. The view in FIG. 13, which is diagrammatic, shows one stringer at 84. A shaft 85 extends between the stringers and, pivotally connected to it, midway of the stringers, is an elongated lever 86. An anchor plate 87 joints one end of the shaft to the stringer, and a similar plate, not shown, joins the other end to the other stringer. The upper end 88 of the lever is connected to the under side of tread 89 through a sensitive coil spring 90 which, when vibrated by a falling person, transmits sufficient movement to the lever to move an arm 91 at the other end of the lever upwardly a sufficient amount to move a releasing lever 92 about its pivot 93 and thus disengage the projection-recess type interlock at 94. It will be understood that coil spring 90 is chosen to bring about the described action. The releasing action of lever 92 has the same effect as the withdrawal of plunger 19 of solenoid 20 in FIG. 5, i.e., it enables the elongated members at the ends of the barrier to extend forwardly, carrying the barrier to extended position. The lower end of the lever 86 has another arm 91a, note FIG. 13a, which functions like arm 91 but at the opposite side of the stairs. It will be understood that arms 91 and 91a, and the connecting piece 95, may have any suitable cross-sectional shape.

In the modification of FIG. 14, an all electrical device is diagrammatically illustrated wherein conventional normally open micro switches 98, 99, and 100 are actuated by a falling person, i.e., by the vibrations created on contact of his body with a tread over the switches. On actuation of a switch, a circuit is established which serves to energize solenoid 101, thus withdrawing its plunger 102 and enabling the barrier, as in the case of FIG. 4, to move to extended position. Transformer 103 functions, in the same way as transformer 36a in FIG. 8. A plurality of microswitches is shown, thus increasing the margin of safety. In operation, a falling person jars a microswitch disposed on a tread above the barrier, such as tread 104 of FIG. 14a, and the resulting vibration actuates a sensitive reed 105, which is pivotally connected at 106 to a wall of the enclosure 106a, causing the reed to move so that a weighted bar or contact 107, opposite the pivot, touches the contact 108, thus establishing a circuit like that shown in FIG. 8. The energized circuit energizes solenoid 101, thus setting in train the events which bring about movement of the barrier to extended position.

The modification of FIG. 15 is adapted for use with stairs of more solid construction than those shown, i.e., stairs of concrete, which present a greater problem if one contemplates cutting a slot through a riser for passage of the barrier. While concrete stairs may be initially constructed with such slot, in which case the devices of the preceding views may be used, in many cases it will be desired to install the safety device on existing stairs, and this will call for a different approach, such as that illustrated in FIG. 15. Here the retracted barrier is adapted to be stored on the stairs, rather than beneath them, and as shown, it is placed against a riser 110 and suitably covered by a shield 111 which is fastened to the adjacent wall 112 by a fastening plate 113. The upper end portion of the barrier is shown as supported by a sphere or ball 114 having an extension 115 which is connected to the wire 116, as in the case of extension 46 and wire 47 of FIG. 4. At 117 is a covering for the leading edge of the barrier. The sphere 114, and the companion sphere 118, are disposed in a bent tube 119, the portion 119a of which is approximately at right angles to the incline of the stairs. The spheres are movable in the tube 119 as the barrier is extended and retracted. The sphere 118 bears against the plug 120, in the skirt 121 of which it is partially enclosed. A compressed spring 122 acts against sphere 114, and the latter in turn presses against sphere 118. The plug 120 is held against movement by the engaging plunger 123 of solenoid 124. On actuation of the device by a falling person, plunger 123 releases plug 120, and the barrier is moved to its extended positon under the action of spring 122. During this action, the described spheres move upwardly in tube 119 and are able to negotiate the bend in the tube by virtue of their rounded shape. The tube is slotted at 125 to receive the extension 115. A stop (not shown) at the upper end of tube 119 prevents the barrier from passing out of the tube; and a pad 126 of suitable resilient material on the plug 120 serves to absorb any impact with the stop. The extended barrier may be retracted by hand in the manner described. At 127 a housing is indicated for enclosing the solenoid and transformer, the latter not shown. The tube opposite tube 119, i.e., the companion tube, which is not shown, may be suitably enclosed, in the event it stands free, as by a post or other enclosure, with provision being made for movement of the barrier.

Another modified mat is shown in FIGS. 16 and 17, in which spaced rows 130, 131, 132 of movable magnetizable conducting spheres 133 serve as movable contacts. Each row of spheres is aligned in a groove 130a, 131a, 132a, and at the top of each groove are pairs 130b, 131b, 132b of parallel conducting wires. The wires of each pair emerge from the grooves, joining conductors 134, 135. A non-magnetizable nonconducting plate 136 covers the grooves, and above this is a layer 137 of rubber. In operation, a sphere such as that at 138 is drawn upwardly, note FIG. 17, by the attraction of magnet 139, thereby making contact with both wires of pair 132b, and establishing a circuit like that of FIG. 8. As a result, the barrier is extended in the manner described. The spheres may be solid or hollow.

It will be apparent that in all the modifications an extendable and retractable barrier is normally retracted to a position adjacent the stairs and is extendable therefrom to a position above the stairs. In extended position it is disposed substantially across the width of the stairs in order to catch a falling person. Laterally disposed support means at each lateral side support the barrier, and against such means a spring is biased which is operable to push the barrier to extended position. Normally, the barrier is held in retracted position by releasable stop means which oppose the action of the spring. On one or more treads above the barrier are located means, actuated by a falling person, for releasing the stop means, with the result that the spring is freed and enabled to push the barrier to extended position.

As described, the safety device is especially intended for children and the aged, comprising groups of persons most apt to make missteps in using stairs. Also, with these groups it is more convenient to get a person to wear magnetic articles or clothing containing one or more magnets suitably attached thereto. In the case of children, magnets may be installed in almost any item of clothing, and the magnet may take the form of magnetic diaper pins, ankle bands, belt buckles, etc. Aged persons, particularly those in nursing homes, may wear magnetic corset stays, watch bands, jewelry, hair devices, or may have magnets incorporated in garters, ankle bands, belts, and the like.

Of the modifications shown, that having the retractable or telescoping tubes is preferred for the sake of appearance, although the modification of FIG. 9, having one fixed elongated member, is economical in that a less rugged construction may be required.

It will be understood that the invention is capable of obvious variations without departing from its scope.

In the light of the foregoing description, the following is claimed:

1. In a safety device for persons liable to fall downstairs, an extendable and retractable barrier normally retracted to a position adjacent the stairs and extendable therefrom to a position over the stairs, said barrier in extended position being disposed substantially across the width of the stairs to catch a falling person, lateral support means at each lateral side of the barrier for supporting the same, spring means biased against said support means and active to push said barrier towards the extended position thereof, releasable stop means adjacent said support means for retaining said barrier in fixed position against the action of said spring means, and means actuated by a falling person for releasing said stop means, thereby freeing said spring means and enabling the same to push said barrier to said extended position where it can catch said falling person.

2. The device of claim 1 wherein said support means comprises an elongated member at each lateral side of the barrier.

3. The device of claim 1 wherein the stairs have a space beneath the same where said barrier in retracted position is storable.

4. The device of claim 1 wherein the stairs are of solid construction and said barrier is storable adjacent a rise.

5. The device of claim 2 wherein said releasable stop means comprises a solenoid having a plunger extendable to retain said member in said fixed position, and wherein the coil of said solenoid is connected in an electric circuit controlled by each of a plurality of switches disposed on a tread adjacent to and above said barrier, said switches being disposed intermediate upper and lower surfaces of the tread, each switch having an contact movable to energize said circuit, means actuated by a falling person for moving said contact to energize said circuit, and the energization of said circuit serving to energize said coil and to retract said plunger, thereby freeing said spring means and enabling the same to push said member and barrier to said extended position where it can catch said falling person.

6. The device of claim 5 wherein each said movable contact is magnetizable, and wherein said falling person has a magnet which is brought in close proximity to the upper surface of said tread, thereby to move said contact to energize said circuit.

7. The device of claim 5 wherein said movable contact is a part of a sensitive micro switch actuatable by vibration, and wherein said falling person creates a vibration which actuates said micro switch, thereby to energize said circuit.

8. The device of claim 2 wherein said releasable stop means comprises a mechanically interlocking projection and recess, said recess being in said member, said projection being connected to a lever which is movable by vibration to release the projection from interlock, and wherein said falling person creates a vibration which moves said lever to release the projection.

9. The device of claim 2 wherein said elongated member comprises a plurality of hollow concentric tubes of which two are disposed for sliding movement in a fixed hollow tube, and wherein interengaging means are provided on said tubes for limiting the sliding movement of the slidable tubes.

References Cited

UNITED STATES PATENTS

| | | | |
|---|---|---|---|
| 753,326 | 3/1904 | Smith | 182—138 |
| 1,012,947 | 12/1911 | Weisfeld et al. | 182—138 |
| 2,755,009 | 7/1956 | Parker | 182—129 |

FOREIGN PATENTS

| | | |
|---|---|---|
| 1,244,252 | 10/1960 | France. |

REINALDO P. MACHADO, Primary Examiner.

U.S. Cl. X.R.

182—106, 46